United States Patent
Rafaely et al.

(10) Patent No.: US 11,051,123 B1
(45) Date of Patent: Jun. 29, 2021

(54) PERCEPTUALLY-TRANSPARENT ESTIMATION OF TWO-CHANNEL ROOM TRANSFER FUNCTION FOR SOUND CALIBRATION

(71) Applicant: B. G. NEGEV TECHNOLOGIES & APPLICATIONS LTD., AT BEN-GURION UNIVERSITY, Beer Sheva (IL)

(72) Inventors: Boaz Rafaely, Kfar Saba (IL); Hai Morgenstern, Tel Aviv-Jaffa (IL)

(73) Assignee: B. G. NEGEV TECHNOLOGIES & APPLICATIONS LTD., AT BEN-GURION UNIVERSITY, Beer Sheva (IL)

(*) Notice: Subject to any disclaimer, the term of this patent is extended or adjusted under 35 U.S.C. 154(b) by 0 days.

(21) Appl. No.: 17/058,724

(22) PCT Filed: May 27, 2019

(86) PCT No.: PCT/IL2019/050602
§ 371 (c)(1),
(2) Date: Nov. 25, 2020

(87) PCT Pub. No.: WO2019/229746
PCT Pub. Date: Dec. 5, 2019

Related U.S. Application Data

(60) Provisional application No. 62/677,078, filed on May 28, 2018.

(51) Int. Cl.
H04S 7/00 (2006.01)
(52) U.S. Cl.
CPC .................... H04S 7/307 (2013.01)

(58) Field of Classification Search
None
See application file for complete search history.

(56) References Cited

U.S. PATENT DOCUMENTS

| 9,031,268 B2 * | 5/2015 | Fejzo | ........ H04R 5/02 381/303 |
| 10,251,015 B2 | 4/2019 | Bahne et al. | |

(Continued)

OTHER PUBLICATIONS

Cecchi S Carini and Spors S, Room response equalization—A review—Applied Sciences, 8(1), p. 16, Dec. 23, 2017.

(Continued)

*Primary Examiner* — James K Mooney
(74) *Attorney, Agent, or Firm* — Dority & Manning, P.A.

(57) ABSTRACT

A system and method for performing perceptually-transparent RTF estimation for a two-channel system with low estimation errors. The system includes two loudspeakers for the left and right channels positioned in a room and a single microphone, positioned in the vicinity of a listener in the room. The system performs spectral splitting using a filter bank and a complementary filter bank, to obtain separation in frequency between the two channels. Calibration signals being uncorrelated across the two channels are, generated using the original audio signals and the constructed filters. Then, the calibration signals are played back by the loudspeakers, instead of playback of the original audio signals. At the end, the system records the playback of the calibration signals by the microphone and simultaneously estimates the two-channel RTF using the recorded played back calibration signals.

10 Claims, 14 Drawing Sheets

(56) References Cited

U.S. PATENT DOCUMENTS

2017/0238118 A1* 8/2017 Bahne .................... H04R 3/12
                                                    700/94
2018/0249272 A1* 8/2018 Dyreby .................. H04R 5/02

OTHER PUBLICATIONS

International Search Report for PCT/IL2019/050602 dated Sep. 4, 2019, 4 pages.
Rasumow E. Balu et al., Smoothing individual head-related transfer function in th efrequency and spatial domains, The Journal of Acoustical Society of America, Apr. 2014, 135(4); 2012-25.
Temme S. audio distortion measurements, Application Note, Bruel & Kjar, May 1992.
Tzur M. Goldin, Sound equalization in a noisy environment, Preprints—Audio Engineering Society, May 2001.
Written Opinion for PCT/IL2019/050602 dated Sep. 4, 2019.

\* cited by examiner

PERCEPTUALLY-TRANSPARENT ESTIMATION OF TWO-CHANNEL ROOM TRANSFER FUNCTION FOR SOUND CALIBRATION

CROSS REFERENCE TO RELATED APPLICATIONS

This application is the U.S. National Stage entry of International Application Number PCT/IL2019/050602 filed under the Patent Cooperation Treaty having a filing date of May 27, 2019, which claims priority to U.S. Provisional Patent Application No. 62/677,078 having a filing date of May 28, 2018, which are incorporated herein by reference.

FIELD OF THE INVENTION

The present invention relates to the field of sound calibration. More particularly, the invention relates to a method and system for estimating the Room Transfer Function (RTF) in order to enable automatic sound calibration while hearing, without the need of user intervention.

BACKGROUND OF THE INVENTION

Sound calibration is employed in many commercial audio systems for improving sound quality and make adaptation of the audio system to the existing acoustic environment (which may vary, due to echoes, reflections from walls etc.). This process includes the estimation of the Room Transfer Function (RTF) between each loudspeaker and a microphone located at the listeners' position.

Current methods for RTF estimation employ calibration signals, such as noise or tones, in a dedicated process applied separately to each loudspeaker. However, such an estimation disrupts normal playback, is time consuming, and requires user intervention.

Sound calibration for audio systems is a process in which the parameters of each channel or each loudspeaker are adjusted to improve sound quality (e.g., by controlling the delay and gain of each loudspeaker). The parameters typically include frequency equalization, loudness level, and time-delays, and are adjusted based on the acoustic environment in the room and the location of the sound system. This process usually requires the use of a microphone for estimating the Room Transfer Function (RTF). Current methods for RTF estimation employ excitation, or calibration signals, to estimate the RTF in a dedicated process applied to each loudspeaker separately, and a microphone assumed to be located in the vicinity of the listeners. Excitation signals include maximum-length sequences, inverse-repeated sequences, sweep sines (linear and logarithmic), impulses, periodic impulse excitation, time-stretched pulses, random noise, pseudo-random noise, and periodic random excitation, while the variety of applications include sound calibration, video conferencing/multimedia communication systems, virtual and augmented reality, auralization, and spatialization of sounds. All the above methods employ a calibration signal, which makes the task of RTF estimation time-consuming, necessitates user intervention, and interrupts the normal use of the audio system.

There are also RTF estimation methods that employ non-dedicated source signals, which allows a more natural measurement of a system during playback. In this case, the source signals should cover all frequencies of interest in the long term, and typically require longer averaging times to achieve good estimates compared to typical excitation signals. Applications typically include echo cancellation and source localization, wherein speech signals are used for estimating the RTFs. However, these methods are suited for a system with a single loudspeaker. For multi-channel audio systems, these methods could still be applied, but may require playback using one loudspeaker at a time, which again may interrupt the normal playback of the system.

An RTF estimation process for multi-channel audio systems that more naturally integrates with the normal operation of the system and that is perceptually-transparent to listeners could be of great interest. Such a process could also be made automatic, without requiring user-intervention, and could therefore be applied when necessary to compensate for time-varying acoustic conditions.

The signal measured by the microphone, y(f), is given by:

$$y(f)=H_L(f)s_L(f)H_R(f)s_R(f), \qquad (Eq.\ 1)$$

where f denotes frequency, $s_L(f)$ and $s_R(f)$ are the input signals of the left and right channels, respectively, and $H_L(f)$ and $H_R(f)$ are the RTFs of the left and right loudspeakers, respectively. For mono playback, $s_L(f)=s_R(f)=s(f)$.

Practically, a noise component that can model acoustic noise, modelling noise, and transducer noise may be added to y(f), however, noise is not added for simplicity.

One of the existing methods for RTF estimation is a dual-channel FFT analysis [20], which works with various calibration signals, including real-world audio signals. As an example, the estimation of the left RTF, $H_L(f)$, is presented. For this purpose, playback only from the left loudspeaker is employed, while the right input signal, $s_R(f)$, is assumed to be zero. Therefore Eq. (1) can be written as:

$$y(f)=H_L(f)s_L(f). \qquad (Eq.\ 2)$$

The estimated RTF is calculated using the auto spectra (which shows the distribution of a signal's energy across frequency) of the input signal, and the cross spectrum (an indication of how common activity between two processes is distributed across frequency) between the input signal and the output signal. The auto spectra of $s_L(f)$ is defined as:

$$S_{s_L s_L}(f)=E[s^*_L(f)s_L(f)], \qquad (Eq.\ 3)$$

where $E[\cdot]$ is the statistical expectation and $(\cdot)^*$ denotes the complex conjugate. In practice, the spectra are computed using estimations of the statistical expectation, calculated by averaging the spectra over multiple time blocks. For simplicity of notation, the spectra are presented using statistical expectations. Furthermore, the block time duration is assumed to be sufficiently long compared to the RTF, $H_L(f)$, in time, as required by the multiplicative transfer function assumption [21].

Also, a time window function may be applied to each block in practice for a modified periodogram (an estimate of the spectral density of a signal) with desired frequency characteristics [22] (details regarding the calculation of the spectra can be found in [20]).

The cross spectrum is given by:

$$S_{s_L y}(f)=E[s^*_L(f)y(f)], \qquad (Eq.\ 4)$$

and is approximated in practice using time averaging, as in the case of the auto spectra. Given the spectra, there are several ways to estimate the RTF, $H_L(f)$, with the specific implementation chosen according to where noise is added in the processing chain.

One estimate of the RTF, $\hat{H}_L(f)$, is given by:

$$\hat{H}_L(f) = \frac{S_{s_L y}(f)}{S_{s_L s_L}(f)}, \quad \text{(Eq. 5)}$$

which is proposed when noise is added to the output signal [23].

The description above presented RTF estimation when a single loudspeaker is employed. When both loudspeakers are employed, the output y(f) includes contributions from both loudspeakers. Including the contribution of a non-zero $s_R(f)$ in y(f), as in Eq. (1), $\hat{H}_L M$ from Eq. (5) may be rewritten as:

$$\hat{H}_L(f) = H_L(f) + H_R(f) \frac{S_{s_L s_R}(f)}{S_{s_L s_L}(f)}, \quad \text{(Eq. 6)}$$

where $S_{s_L s_R}(f)$ is the cross spectrum between the left and right input signals. Hence, when signals of both channels are simultaneously employed, there is an error in the estimation if the left and right signals are correlated.

It is therefore an object of the present invention to provide a method and system for estimating the Room Transfer Function (RTF) in order to enable automatic sound calibration while hearing, without the need of user intervention.

It is another object of the present invention to provide a method and system for estimating the Room Transfer Function (RTF), the operation of which is perceptually-transparent to the listener, so as to ensure minimum hearing disturbance.

Other objects and advantages of the invention will become apparent as the description proceeds.

SUMMARY OF THE INVENTION

A method for performing perceptually-transparent RTF estimation for a two-channel system with low estimation errors, comprising the steps of:
a) providing two loudspeakers for the left and right channels positioned in a room and a single microphone, positioned in the vicinity of a listener in the room;
b) performing spectral splitting using a filter bank and a complementary filter bank, to obtain separation in frequency between the two channels, by:
   b.1) selecting/center frequencies, $f_i$, i=0, ... I-1, having values restricted to the range between zero and half of the sampling frequency, $f_s/2$;
   b.2) for each center frequency, defining a corresponding frequency band, $O_i$.
   b.3) for each center frequency and frequency band, constructing a corresponding filter, $B_i(f)$;
   b.4) constructing a filter for the left loudspeaker as a summation of filters for even center frequencies;
   b.5) constructing a filter for the right loudspeaker as a summation of filters for odd center frequencies;
c) generating calibration signals being uncorrelated across the two channels using the original audio signals and the constructed filters;
d) playing back the calibration signals by the loudspeakers, instead of playback of the original audio signals;
e) recording the playback of the calibration signals by the microphone; and
f) simultaneously estimating the two-channel RTF using the recorded played back calibration signals.

The two filter banks may be employed at different operating times.

Preferably, the center frequencies of a complementary set are shifted in frequency (e.g., ¼ octave for ½ octave band), compared to the center frequencies of a set.

Estimated RTFs may be constructed by merging the estimates from each set. Merging RTF estimates of multiple sets may be performed by fixed mapping or by using the pointwise minimum of $|G^*_L(f) G_R(f)|$.

RTF estimates may be performed peroidically every predetermined time, for automatically compensating changes in the acoustic environment.

A method for performing transparent RTF estimation for a multiple-channel system with low estimation errors, comprising the steps of:
a) providing a plurality of loudspeakers for the L channels positioned in a room and a single microphone, positioned in the vicinity of a listener in the room;
b) performing spectral splitting using a filter bank and complementary filter banks, to obtain separation in frequency between the multiple channels, by:
   b.1) selecting/center frequencies, $f_i$, i=0, ... I-1, having values restricted to the range between zero and half of the sampling frequency, $f_s/2$;
   b.2) for each center frequency, defining a corresponding frequency band, $O_i$.
   b.3) for each center frequency and frequency band, constructing a corresponding filter, $B_i(f)$;
   b.4) constructing a filter for each loudspeaker as a summation of filters for predetermined center frequencies;
c) generating calibration signals being uncorrelated across the multiple channels using the original audio signals and the constructed filters;
d) playing back the calibration signals by the loudspeakers, instead of playback of the original audio signals;
e) recording the playback of the calibration signals by the microphone; and
f) simultaneously estimating the multiple-channel RTF using the recorded played back calibration signals.

A system for performing transparent RTF estimation for a multiple-channel system with low estimation errors, comprising:
a) a plurality of loudspeakers for the L channels positioned in a room and a single microphone, positioned in the vicinity of a listener in the room;
b) a filter bank and complementary filter banks, for performing spectral splitting;
c) a processor for separating in frequency between the multiple channels, which is adapted to:
   c.1) select/center frequencies, $f_i$, i=0, ... I-1, having values restricted to the range between zero and half of the sampling frequency, $f_s/2$;
   c.2) for each center frequency, define a corresponding frequency band, $O_i$.
   c.3) for each center frequency and frequency band, construct a corresponding filter, $B_i(f)$;
   c.4) construct a filter for each loudspeaker as a summation of filters for predetermined center frequencies;
   c.5) generate calibration signals being uncorrelated across the multiple channels using the original audio signals and the constructed filters;

d) a player for playing back the calibration signals by the loudspeakers, instead of playback of the original audio signals;
e) a recorder for recording the playback of the calibration signals by the microphone; and
f) at least one processor for simultaneously estimating the multiple-channel RTF using the recorded played back calibration signals.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF PREFERRED EMBODIMENTS

Figure 1:
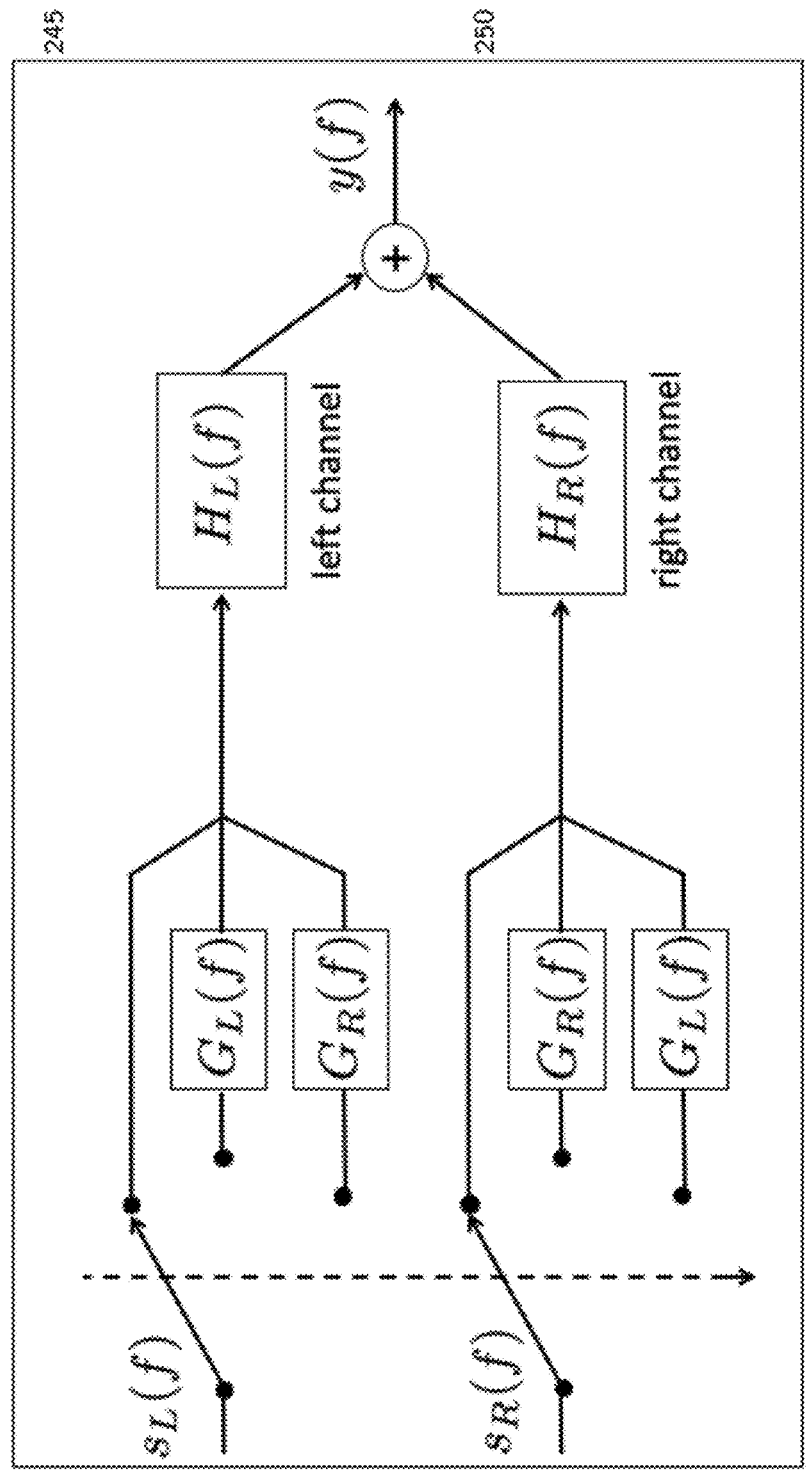
FIG. 1 illustrates the system block diagram, in which the processing of the left and right input signals before playback is controlled by a single switch.

The present invention proposes a perceptually-transparent RTF estimation method for a two-channel system (that may be extended to a multiple-channel system) with low estimation errors. The proposed method employs calibration signals generated using the original audio signals and complementary filters. These calibration signals are uncorrelated across the two channels, which facilitates the estimation of both channels (or multiple channels in the case of a multiple-channel system) using a single microphone. In this embodiment, the microphone is positioned in the vicinity of a listener.

The proposed method is based on spectral splitting with complementary filter banks and is applied to produce signals for two channels, as described for example in [17, 18]. The proposed method employs complementary filter banks to produce estimation signals (referred to as calibration signals) for the two loudspeakers. These calibration signals are shown to be perceptually similar to the original, unprocessed audio signals, which could be explained by the phenomenon of spectral fusion [19]. By using complementary filter banks, the processed calibration signals become uncorrelated across the two channels and can be used for simultaneous estimation of the two-channel RTF.

Looking again at Eq. (1), if $s_L(f)$ and $s_R(f)$ are uncorrelated, $S_{s_L s_R}(f)$ from Eq. (6) is zero, and the RTF could be estimated using the single output signal, y(f). This is the main principle behind the proposed method presented in the following description, where decorrelation is achieved by separation in frequency, which is perceptually transparent to listeners. The basic processing operation is to transmit part of the frequencies to one loudspeaker and the remaining frequencies to another loudspeaker. The ear of the listener integrates these different components. The advantage is that calibration is performed during normal listening of the desired audio content. Another advantage of the proposed method is the fact that calibration may be peroidically done every predetermined time, such that any change in the acoustic environment will be automatically compensated.

Calibration Signals

According to the present invention, given a two-channel input signal, two uncorrelated signals are produced by employing a filter bank and a complementary filter bank. In this embodiment, the filter banks are presented in a generic manner, even though various sets of center frequencies, filter bandwidths, number of bands, and filter implementations can be used.

To construct the filter banks, I center frequencies, $f_i$, i=0, ... I–1, are initially selected, with their values restricted to the range between zero and half of the sampling frequency, $f_s/2$. For each center frequency, a corresponding frequency band, $O_i$, is defined. For each center frequency and frequency band, a corresponding filter, $B_i(f)$, is constructed.

Filters for the left and right loudspeakers are then constructed. The filter for the left loudspeaker is constructed as a summation of filters for even center frequency indices:

$$G_L(f)=\Sigma_{i=0,2,4,\ldots,I-2}B_i(f). \quad \text{(Eq. 7)}$$

Similarly, a filter for the right loudspeaker is comprised of a summation of filters for odd indices:

$$G_R(f)=\Sigma_{i=1,3,5,\ldots,I-1}B_i(f), \quad \text{(Eq. 8)}$$

while assuming (for simplicity) that/is even.

Next, two signals are generated as loudspeaker input signals given the two-channel input signal and $G_L(f)$ and $G_R(f)$:

$$l(f)=G_L(f)s_L(f), \text{ and} \quad \text{(Eq. 9)}$$

$$r(f)=G_R(f)s_R(f), \quad \text{(Eq. 10)}$$

for left and right loudspeakers, respectively. The cross-spectrum between the two signals is given by:

$$E[l^*(f)r(f)]=G^*_L(f)G_R(f)E[s^*_L(f)s_R(f)]. \quad \text{(Eq. 11)}$$

Since $s_L(f)$ and $s_R(f)$ cannot be assumed to be uncorrelated, as they could be identical for a mono signal, or highly correlated for a stereo signal, achieving decorrelation between these signals requires that:

$$G^*_L(f)G_R(f)=0, \forall f\in[0,f_s/2]. \quad \text{(Eq. 12)}$$

Substituting Eqs. (7) and (8) in Eq. (12), the condition in Eq. (12) can be reformulated as:

$$B^*_i(f)B_j(f)=0, \forall i \text{ even and } j \text{ odd.} \quad \text{(Eq. 13)}$$

This is a sufficient condition to ensure zero correlation if the filters are equal to zero outside their bandwidth, or to ensure low correlation if they have a small gain outside their bandwidth. The proposed de-correlated calibration signals form the basis for RTF estimation.

RTF Estimation with Proposed Calibration Signals and Ideal Filters

RTF estimation is described below for the case of ideal filters, with the following assumptions:

Filters $B_i(f)$ used for generating the calibration signals are ideal, with:

$$B_i(f) = \begin{cases} 1, & \forall f \in O_i(f) \\ 0, & \forall f \notin O_i(f) \end{cases}. \quad \text{(Eq. 14)}$$

The frequency bands used for defining these filters do not overlap, i.e.:

$$O_i \cap O_j = 0, \forall i \neq j. \quad \text{(Eq. 15)}$$

The union of all frequency bands covers the entire frequency range, i.e.:

$$O_{i=[0}^{I-1} f_s/2]. \quad \text{(Eq. 16)}$$

From Eqs. (14) and (15) (i.e., ideal filter with non-overlapping bands), it is clear that Eq. (13) is satisfied, and the correlation of the calibration signals as in Eq. (11) becomes zero. Then, RTF estimation is developed by defining two sets of calibration signals:

$$l_1(f) = G_L(f)s_L(f), r_1(f) = G_R(f)s_R(f), \quad \text{(Eq. 17)}$$

and $$l_2(f) = G_R(f)s_L(f), r_2(f) = G_L(f)s_R(f). \quad \text{(Eq. 18)}$$

Set 1 is defined as in Eqs. (9) and (10). Set 2 (Eq. (18)) is defined as in Eqs. (9) and (10) but with interchanged filters between left and right channels.

Due to the ideal filters which satisfy Eq. (12), the correlation of the calibration signals as in Eq. (11) is zero, i.e. $E[l_1(f)r_1(f)] = E[l^*_2(f)r_2(f)] = 0$.

The calibration signals are played back by the loudspeakers, instead of playback of the original audio signals, as in Eq. (1), and are recorded by the microphone. The new system model in this case becomes:

$$y_1(f) = H_L(f)l_1(f) + H_R(f)r_1(f), \quad \text{(Eq. 19)}$$

$$y_2(f) = H_L(f)l_2(f) + H_R(f)r_2(f). \quad \text{(Eq. 20)}$$

FIG. 1 illustrates the system block diagram, in which the processing of the left and right input signals before playback is controlled by a single switch with three different states:
(1) normal playback with no calibration, according to Eq. (1);
(2) calibration signals set 1 with $y(f) = y_1(f)$, according to Eq. (19);
(3) calibration signals set 2 with $y(f) = y_2(f)$, according to Eq. (20).

RTFs are estimated using the measured signals in Eqs. (19) and (20). Initially, RTFs between these measured signals and the calibration signals from Eqs. (17) and (18) are estimated. For $y_1(f)$, for example, $H_L^1(f)$ is defined similarly to Eq. (5), using:

$$H_L^1(f) = \frac{S_{l_1 y_1}}{S_{l_1 l_1}} = \frac{E[l_1^*(f)y_1(f)]}{E[l_1^*(f)l_1(f)]} \quad \text{(Eq. 21)}$$

$$= \frac{H_L(f)E[|l_1(f)|^2] + H_R(f)E[l_1^*(f)r_1(f)]}{E[|l_1(f)|^2]}$$

$$= H_L(f), \forall f \in O_i, \text{ for even } i, \quad \text{(Eq. 22)}$$

where the last line was derived using Eq. (11) and the conclusion derived above that the correlation is zero for the case of ideal filters.

In order to avoid a zero denominator due to the construction of $r_1(f)$ in Eq. (17), only frequency bands of even indices are considered. Repeating the same estimation process for $y_2(f)$ and $l_2(f)$, $y_2(f)$ and $r_2(f)$, and $y_1(f)$ and $r_1(f)$, will lead to estimation of the two RTFs for the entire frequency range, due to Eq. (16):

$$\hat{H}_L(f) = \begin{cases} H_L^1(f), & \forall f \in \{O_i(f)\}_{i=0,2,4,\ldots,I-2} \\ H_L^2(f), & \forall f \in \{O_i(f)\}_{i=1,3,5,\ldots,I-1} \end{cases}, \quad \text{(Eq. 23)}$$

and $$\hat{H}_R(f) = \begin{cases} H_R^2(f), & \forall f \in \{O_i(f)\}_{i=0,2,4,\ldots,I-2} \\ H_R^1(f), & \forall f \in \{O_i(f)\}_{i=1,3,5,\ldots,I-1} \end{cases}. \quad \text{(Eq. 23)}$$

While the estimation process with ideal filters presented above lead to an estimation process with zero error, filters in practice are never ideal. Therefore, a solution with practical filters is presented hereinbelow.

RTF Estimation with the Proposed Calibration Signals and Practical (Non-Ideal) Filters RTF estimation is described below for the case of practical (non-ideal) filters, with the following assumptions:

Filters $B_i(f)$ used for generating the calibration signals include a pass band, $O_i^{pass}(f)$ and a stop band, $O_i^{stop}(f)$, and are defined in a generic manner as:

$$B_i(f) \approx 1, \forall f \in O_i^{pass}(f),$$

$$|B_i(f)| \leq \in, \forall f \in O_i^{stop}(f), \quad \text{(Eq. 25)}$$

where $\in$ is a predefined threshold. $O_i^{pass}(f)$ and $O_i^{stop}(f)$ do not cover the entire frequency range, as there are frequencies in the transition between these two frequency bands.

The pass bands used for defining these filters do not overlap, i.e.:

$$O_i^{pass} \cap O_j^{pass} = 0, \forall i \neq j. \quad \text{(Eq. 26)}$$

The union of all pass bands covers the entire frequency range, i.e.:

$$\cup_{i=[0}^{I-1} O_i^{pass} = 0, f_s/2]. \quad \text{(Eq. 27)}$$

Under these assumptions, the derivation of the estimation method for ideal filters is repeated with the following differences. $B^*_i(f), B_j(f) = 0$ from Eq. (13) is now replaced by $|B^*_i(f)B_j(f)| \leq \in$ at $i, j \in S$, where $S$ is a subset of bands which are sufficiently distant from one another such that any one pass band overlaps only with stop bands from the other bands. Therefore, Eq. (12) is replaced by $|G^*_L(f)G_R(f)| \leq \in$, and Eq. (11) is replaced by $E[l^*(f)r(f)] \leq \in E[s_L(f)s_R(f)]$ for frequency bands in S.

This leads to a small correlation between signals l(f) and r(f). RTF estimation is repeated for more band subsets, until the entire frequency range is covered. This process is described below for a specific filter implementation and two sets of calibration signals, and can be extended in a similar manner to various filter implementations and multiple sets of calibration signals.

Implementation using ½-octave FIR filters

A design example of filter banks for the proposed estimation method is presented below, based on ½-octave filters with Discrete-Fourier-transform (DFT) based implementation. Here, two sets of filter banks are employed, following the general framework presented for practical filters in the previous section. I=16 center frequencies are selected for the first set of filter banks, and I=15 center frequencies are selected for the second set of filter banks, with the sampling frequency, $f_s$, set to 44100 Hz. The center frequencies are presented in Table 1 for both sets.

TABLE 1

| Octave index | Set 1 ($f_i$) [Hz] | Set 2 ($\tilde{f}_i$) [Hz] |
| --- | --- | --- |
| 0 | 75 | 89 |
| 1 | 106 | 126 |
| 2 | 150 | 178 |
| 3 | 211 | 251 |
| 4 | 300 | 355 |
| 5 | 422 | 501 |
| 6 | 596 | 708 |
| 7 | 841 | 1001 |
| 8 | 1189 | 1413 |
| 9 | 1679 | 1996 |
| 10 | 2371 | 2820 |
| 11 | 3350 | 3983 |
| 12 | 4732 | 5627 |
| 13 | 6683 | 7948 |
| 14 | 9441 | 11227 |
| 15 | 13335 | — |

The center frequencies of set 2 are shifted by a ¼ octave compared to those in set 1. For both sets, and for each center frequency, a corresponding frequency band, $O_i$, is defined as follows:

$$O_i := [2^{-1/4} f_i, 2^{1/4} f_i), \quad i=0,1,\ldots,I-1, \quad \text{(Eq. 28)}$$

where $O_0$ is modified to start at 0 Hz and $O_{I-1}$ is modified to end at $f_s/2$. For both sets, and for each frequency band, a corresponding filter, $b_i[n]$, i=0, I-1, where n is the discrete time index, is constructed using a DFT-based implementation as [24]:

$$b_i[n] = \sum_{q: f_s q/N \in O_i} e^{j2\pi q n/N}, \quad n=0,\ldots,N-1, \quad \text{(Eq. 29)}$$

where N=7055 is the DFT length used for constructing these filters, which, when combined with $f_s$, yield a time duration of 160-ms, and q=0, . . . ,N–1 is the DFT frequency index. In particular, DFT frequency indices that correspond to negative frequencies are also included in the summation in Eq. (29), so that the filters are real in the time domain. The filters in the frequency domain, $B_i(f)$, are calculated by applying a DFT on $b_i[n]$. Then, $G_L(f)$ and $G_R(f)$ are constructed as in Eqs. (7) and (8), respectively, using filters $B_i(f)$.

Figure 2:
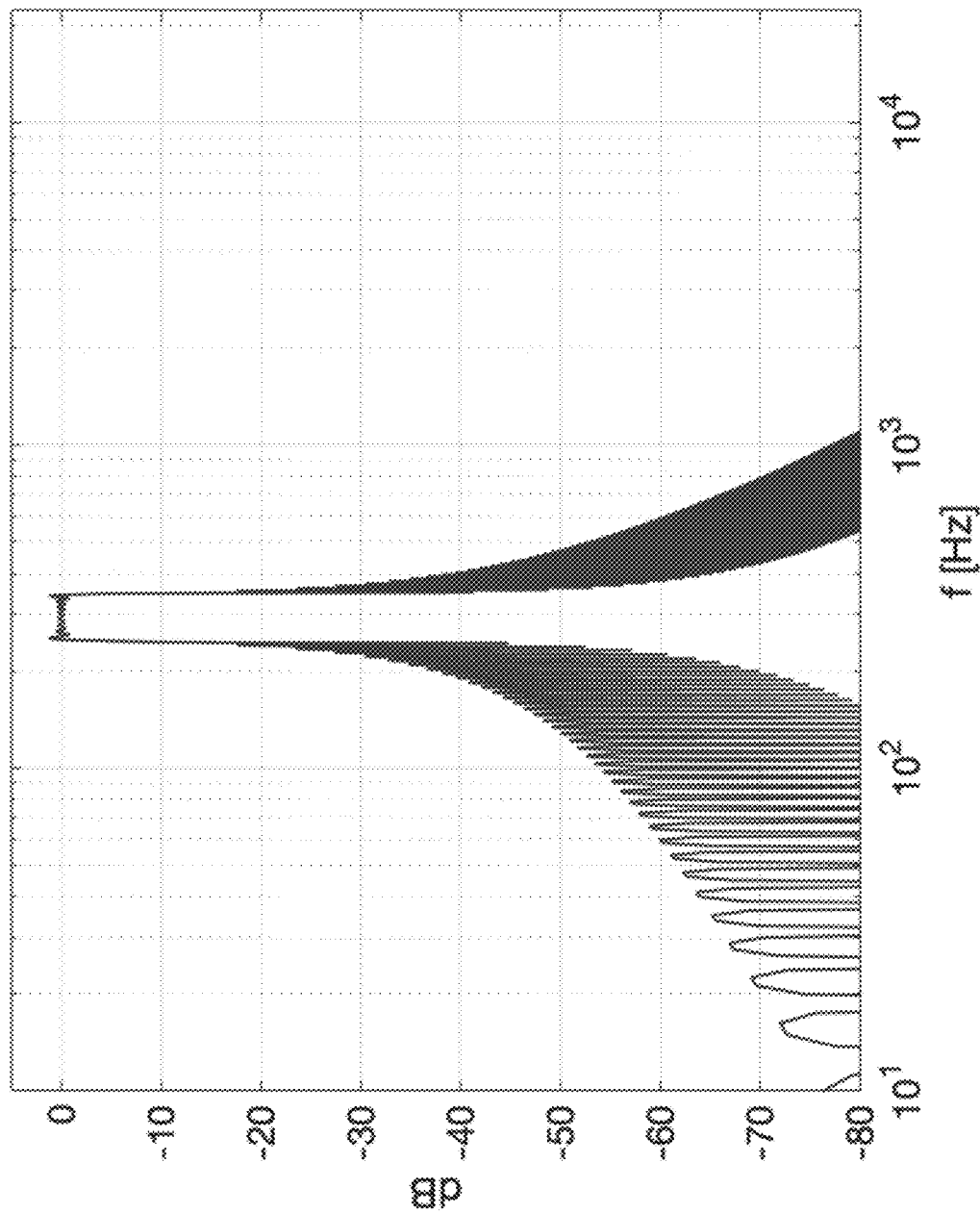
FIG. 2 is an illustrative example of filter $B_4(f)$ from set 1 for ½-octave filters for a DFT-based implementation of length 5N, to obtain improved frequency resolution.

FIG. 2 is an illustrative example of filter $B_4(f)$ from set 1 for ½-octave filters for a DFT-based implementation of length 5N, to obtain improved frequency resolution. A magnitude close to unity is observed at the corresponding octave band, while a relatively high attenuation is observed away from the pass band. The remaining filters, $B_i(f)$, show similar behavior.

Figure 3:
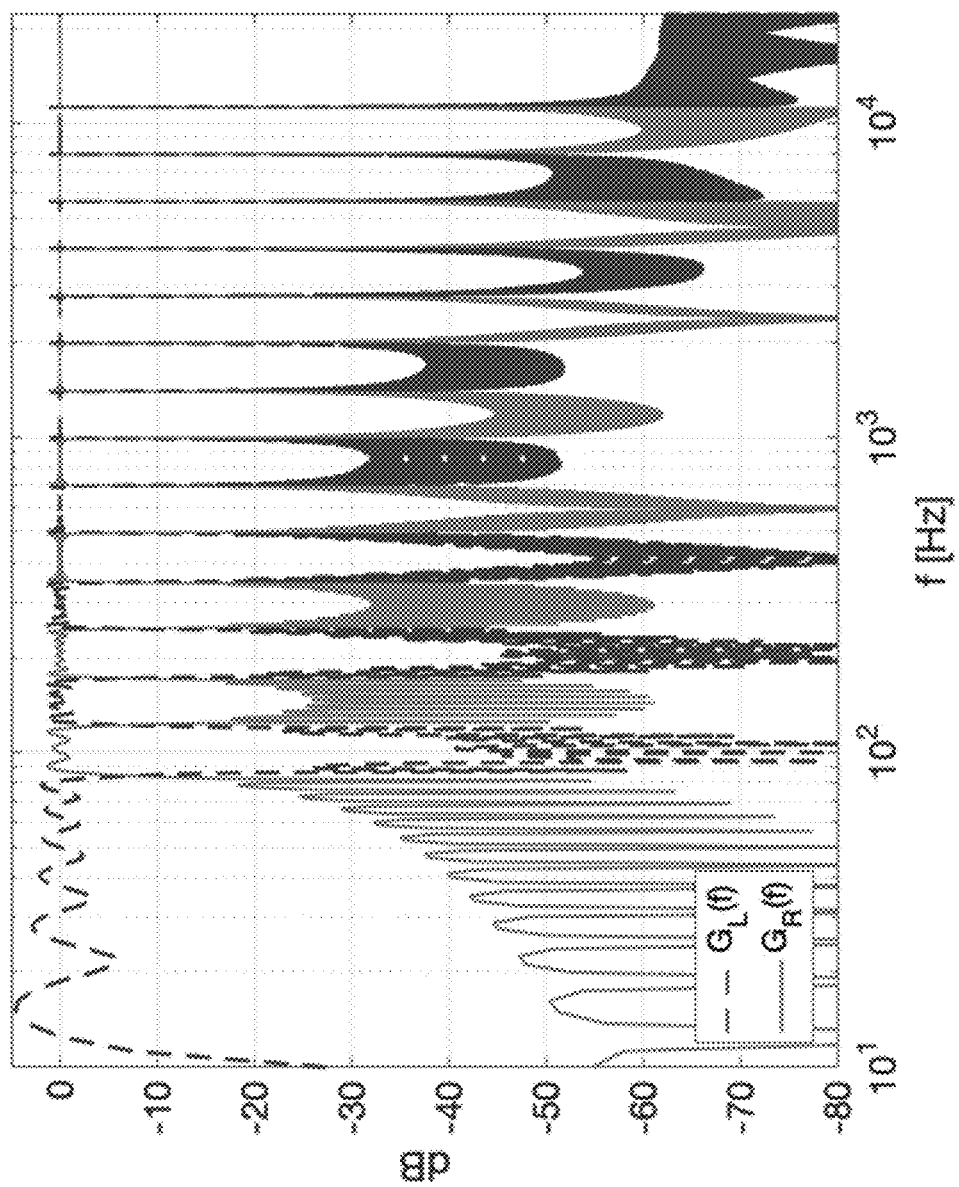
FIG. 3 is an illustrative example of filters $G_L(f)$ and $G_R(f)$ from set 1 for ½-octave filters for a DFT-based implementation of length 5N.

FIG. 3 is an illustrative example of filters $G_L(f)$ and $G_R(f)$ from set 1 for ½-octave filters for a DFT-based implementation of length 5N. Due to the construction using filters from Eq. (29), $G_L(f)$ and $G_R(f)$ sum to unity at the original DFT frequencies, and the inverse DFT of the summation of these functions gives an impulse function, which was a consideration for this specific implementation. Filters from set 2 are not presented as they are similar in behavior.

Figure 4:
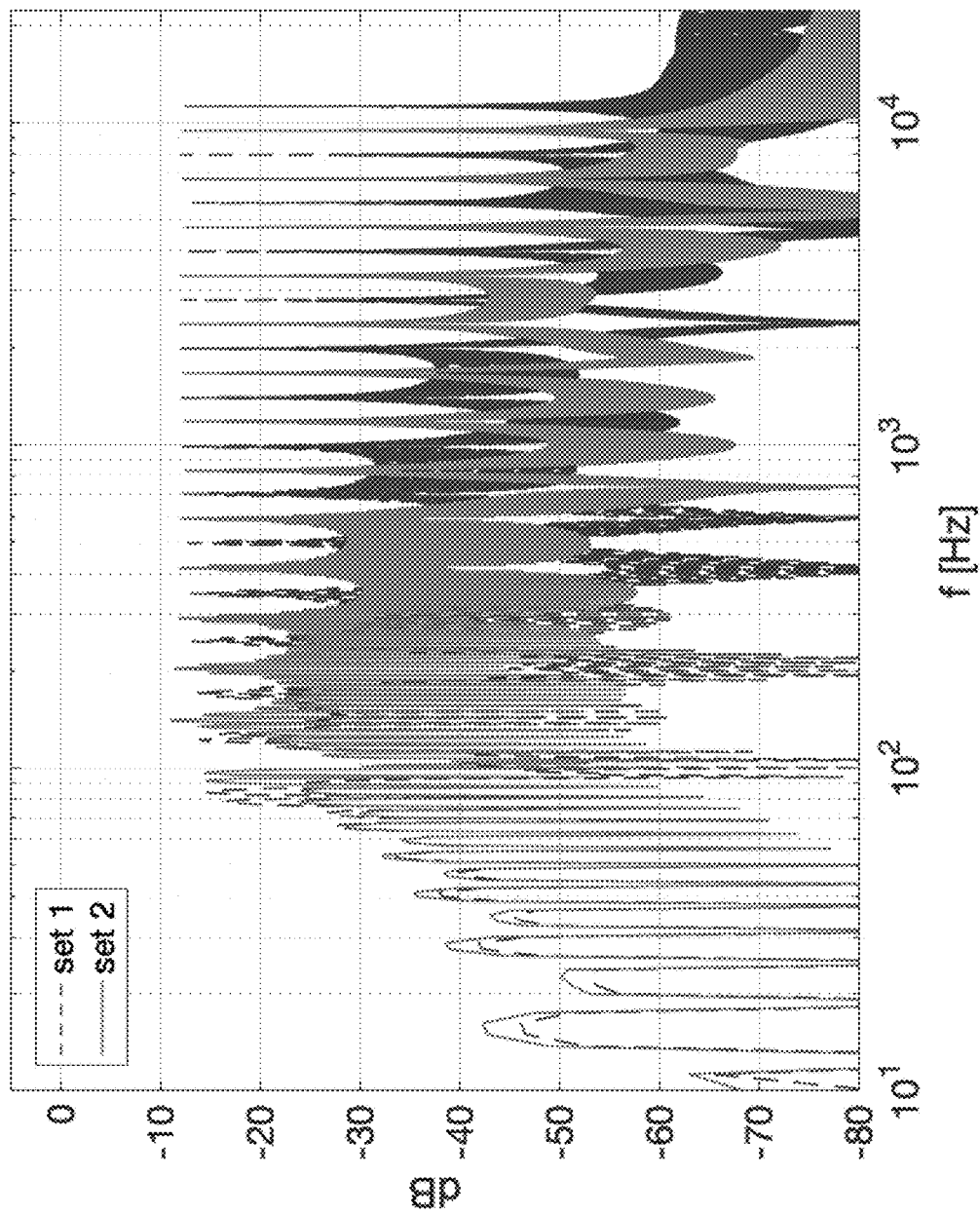
FIG. 4 illustrates $|G^*_L(f)G_R(f)|$ for ½-octave filters with DFT-based implementation for both sets of filters with predetermined center frequencies.

FIG. 4 illustrates $|G^*_L(f)G_R(f)|$ for ½-octave filters with DFT-based implementation for both sets of filters with center frequencies given in Table 1. $|G^*_L(f)G_R(f)|$ is proportional to the correlation (see Eq. (11)). High values of $|G^*_L(f)G_R(f)|$ are obtained for both sets at frequencies in the transition between the frequency bands. At these frequencies, correlation is expected to be higher, and this may degrade RTF estimation in Eq. (21). However, at frequencies where $|G^*_L(f)G_R(f)|$ is high for set 1, it is low for set 2 and vice versa.

Figure 5:
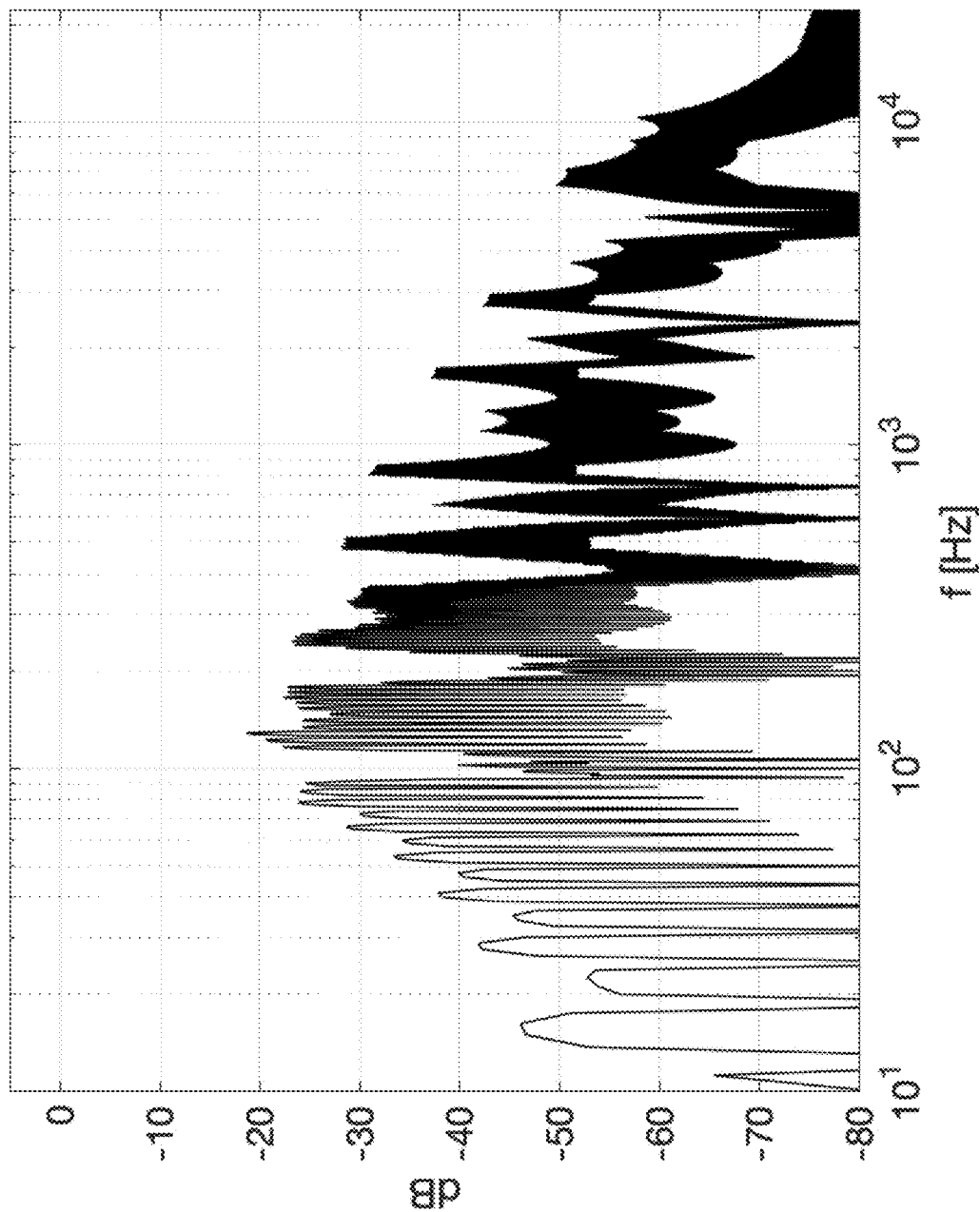
FIG. 5 presents the pointwise minimum of $|G^*_L(f)G_R(f)|$ between both sets.

FIG. 5 presents the pointwise minimum of $|G^*_L(f)G_R(f)|$ between both sets, which can be considered as the effective $|G^*_L(f)G_R(f)|$ for both sets. The pointwise minimum of $|G^*_L(f)G_R(f)|$ for both sets is lower than approximately −20 dB at all frequencies, which can facilitate improved estimation using two sets compared to estimation using a single set. This is the reason that the filters are divided into two sets in the manner described in Table 1 (i.e., using a ¼-octave shift between the two sets).

At the next stage, the mapping of frequencies that have minimum $|G^*_L(f)G_R(f)|$ for each set can be used for constructing estimated RTFs by merging the estimates from each set. At frequencies where $|G^*_L(f)G_R(f)|$ of set 1 is minimal, RTFs can be estimated (as described above with respect to RTF estimation with proposed calibration signals and ideal filters) for signals corresponding to set 1. Similarly, at frequencies where $|G^*_L(f)G_R(f)|$ of set 2 is minimal RTFs can be estimated using signals corresponding to set 2. Other methods for merging RTF estimates of multiple sets, such as a fixed mapping, can be implemented using the center frequencies of each set.

Analysis of RTF estimation using the proposed method is described below for an experimental system comprising a stereo loudspeaker system and a single microphone positioned in a room. The analysis includes an investigation of the frequency-dependent error between estimated and measured RTFs and the total error.

Setup

A set of RTFs was measured using a system comprised of two KRK ROKIT 6" loudspeakers and a Bruel & Kjaer ½-inch diffuse-field microphone, which were connected via an ESI U24XL soundcard to a laptop. The room where the experiment took place is a meeting room at Ben-Gurion University of the Negev, with dimensions of (7.2, 6.4, 3.1) m, an approximate volume of 143 m³, and a reverberation time of about 0.5 s. The reverberation time was calculated from measured Room Impulse Responses (RIRs) using the Schroeder backward integration [25]. The left and right loudspeakers were positioned at (0.3, 1.6, 0.7) m and (0.3, 0.8, 0.7) m, with a distance of 0.8 m between the loudspeakers. The microphone was positioned at (2.8, 1.2, 1.05) m, which is 2.5 m away from the middle point connecting the loudspeakers. The system was placed slightly towards the room corner due to a large meeting table positioned in the room.

Input Signals

An analysis is provided for various stereo input signals that include white noise, speech, and music, and for the ½-octave filters presented in the previous section. Three different 20-second duration stereo audio signals were used as input signals:
1. white (uniform) noise,
2. jazz music (taken from [26]),
3. pop music (taken from [27]), and
4. speech (taken from [28]).

Methods

The RTFs of the two channels were measured as follows. Each loudspeaker (separately) played back a 20-second white-noise signal. The signal recorded by the microphone along with the input signal of the loudspeakers were recorded by the computer. RTFs from the two loudspeakers to the microphone position were then computed using these signals and MATLAB's tfestimate function, with a 1-second duration window and an overlap factor of 2. For each transfer function, a corresponding RIR was calculated using an inverse DFT, and these are denoted $h_L[n]$ and $h_R[n]$ for the left and right channels, respectively. The system buffer, or time delay, due to all hardware components including the sound card was compensated for.

To investigate estimation using the proposed method, signals $y_1(f)$ and $y_2(f)$ as in Eqs. (19) and (20), respectively, were generated in a computer simulation using the measured RTFs and calibration signals generated using the filters presented in the previous section. Noise was generated using a zero-mean Gaussian distribution and added to the output signals to model measurement noise. The variance of the noise was set equal over frequency to produce a 40 dB average Signal-to-Noise Ratio (SNR). $H_L^1(f)$, $H_L^2(f)$, $H_R^1(f)$, and $H_R^2(f)$ were calculated for both sets as in Eq. (21) using MATLAB's tfestimate function with a 1-second duration window and an overlap factor of 2. Estimated left and right RTFs, $\hat{H}_L(f)$ and $\hat{H}_R(f)$, respectively, were then estimated twice. First, $\hat{H}_L(f)$ and $\hat{H}_R(f)$ were estimated for set 1 only, as in Eqs. (23) and (24). Then, $\hat{H}_L(f)$ and $\hat{H}_R(f)$ were estimated for both sets, using the implementation using ½-octave FIR filters that employs the pointwise minimum of $|G^*_L(f)G_R(f)|$ of both sets (see FIG. 5).

A frequency dependent error has been defined as $|H_L(f)-\hat{H}_L(f)|$ and $|H_R(f)-\hat{H}_R(f)|$, for the left and right channels, respectively. A normalized error has been calculated as $|H_L(f)-\hat{H}_L(f)|/|H_L(f)|$ and $|H_R(f)-\hat{H}_R(f)|/|H_R(f)|$ for the two channels, respectively, and was averaged in ⅓ octaves so as to avoid ill-conditioning at frequencies at which the RTFs magnitudes are low. The total error has been calculated as $\|H_L(f)-\hat{H}_L(f)\|/\|H_L(f)\|$ and $\|H_R(f)-\hat{H}_R(f)\|/\|H_R(f)\|$ for the left and right loudspeakers, respectively, where $\|\cdot\|$ denotes the 2-norm.

Results

Figure 6:
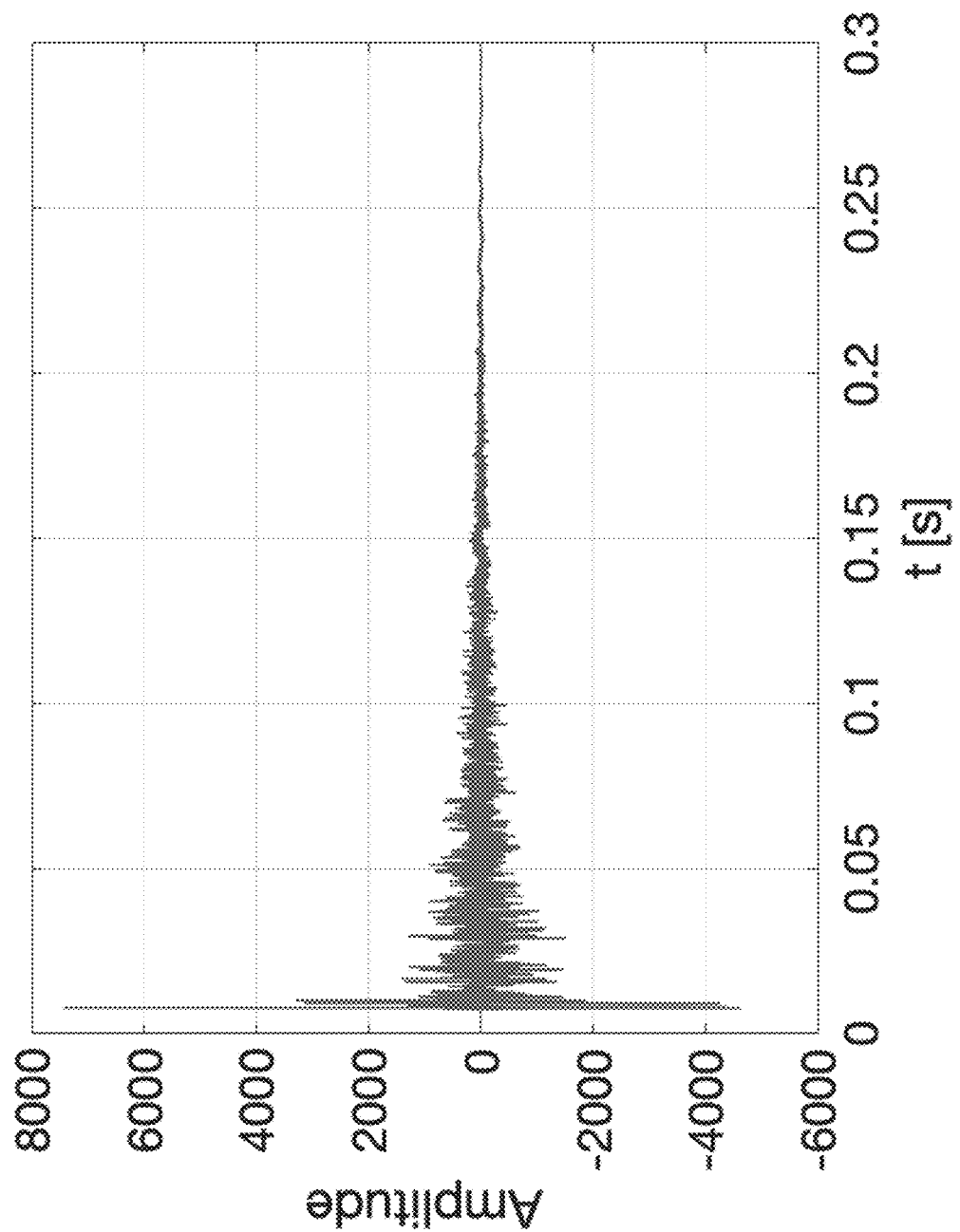
FIG. 6 shows measured RIR $h_L[n]$ for left channel.
Figure 7:
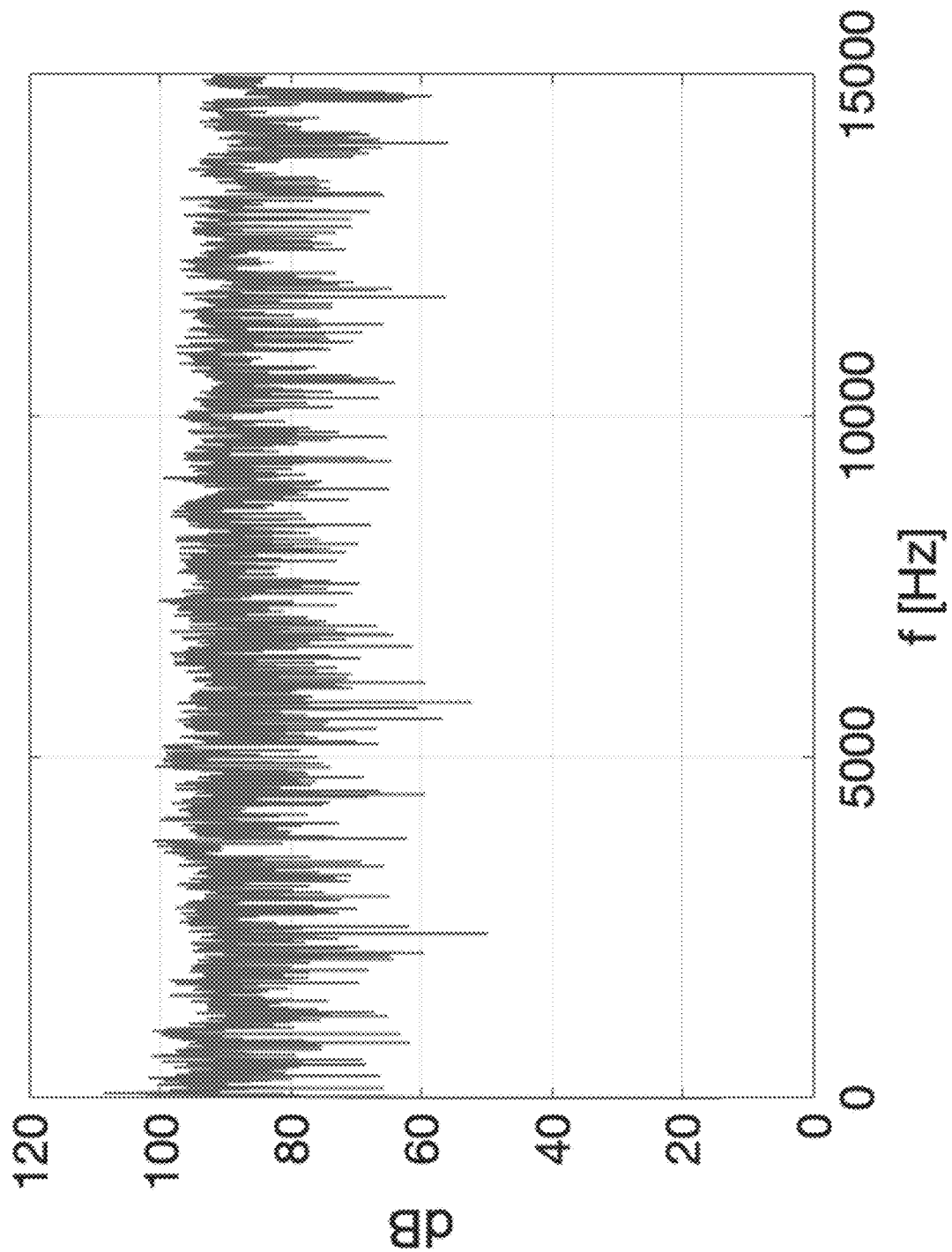
FIG. 7 shows measured RTF for left channel ($H_L(f)$)

FIG. 6 shows measured RIR $h_L[n]$ for left channel. FIG. 7 shows measured RTF for left channel ($H_LM$).

Figure 8:
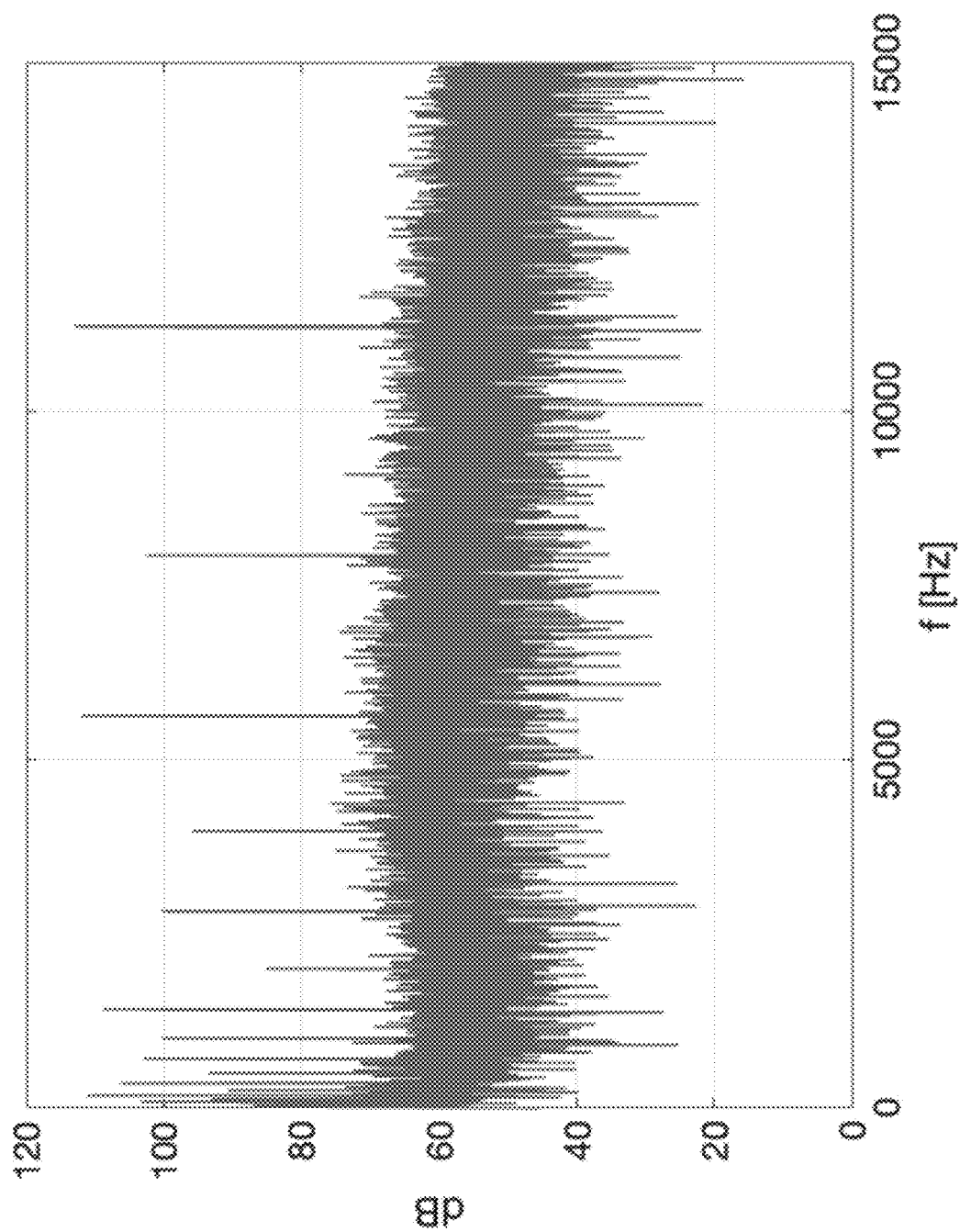
FIG. 8 illustrates the frequency dependent error $|H_L(f) - \hat{H}_L(f)|$ for the left channel, estimated using set 1 only.

FIG. 8 illustrates the frequency dependent error $|H_L(f)-\hat{H}_L(f)|$ for the left channel, estimated using set 1 only, which represents the difference between the measured RTF and the estimated RTF. The difference signal shows large errors at frequencies near the transition between the pass and stop bands of the filters used to construct $G_L(f)$ and $G_R(f)$. Similar results are obtained for the right channel RTF and for calibration signals generated for the remaining input signals.

Figure 9:
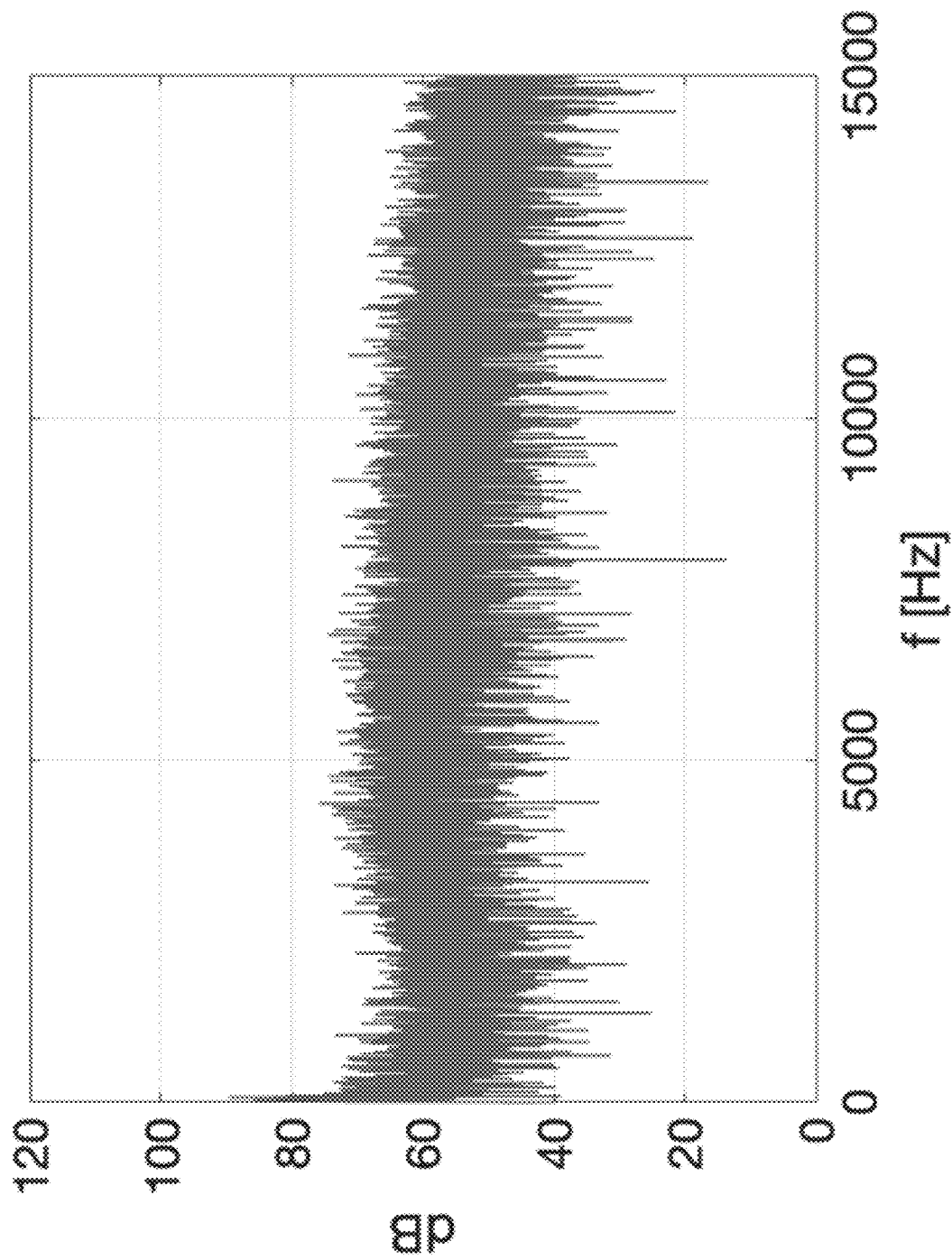
FIG. 9 shows the difference between the measured RTF and the estimated RTF using both sets.

FIG. 9 shows the difference between the measured RTF and the estimated RTF using both sets. The difference signal in this case is 20 dB lower than the measured RTF at most frequencies, including the transitions between the frequency bands.

Figure 10:
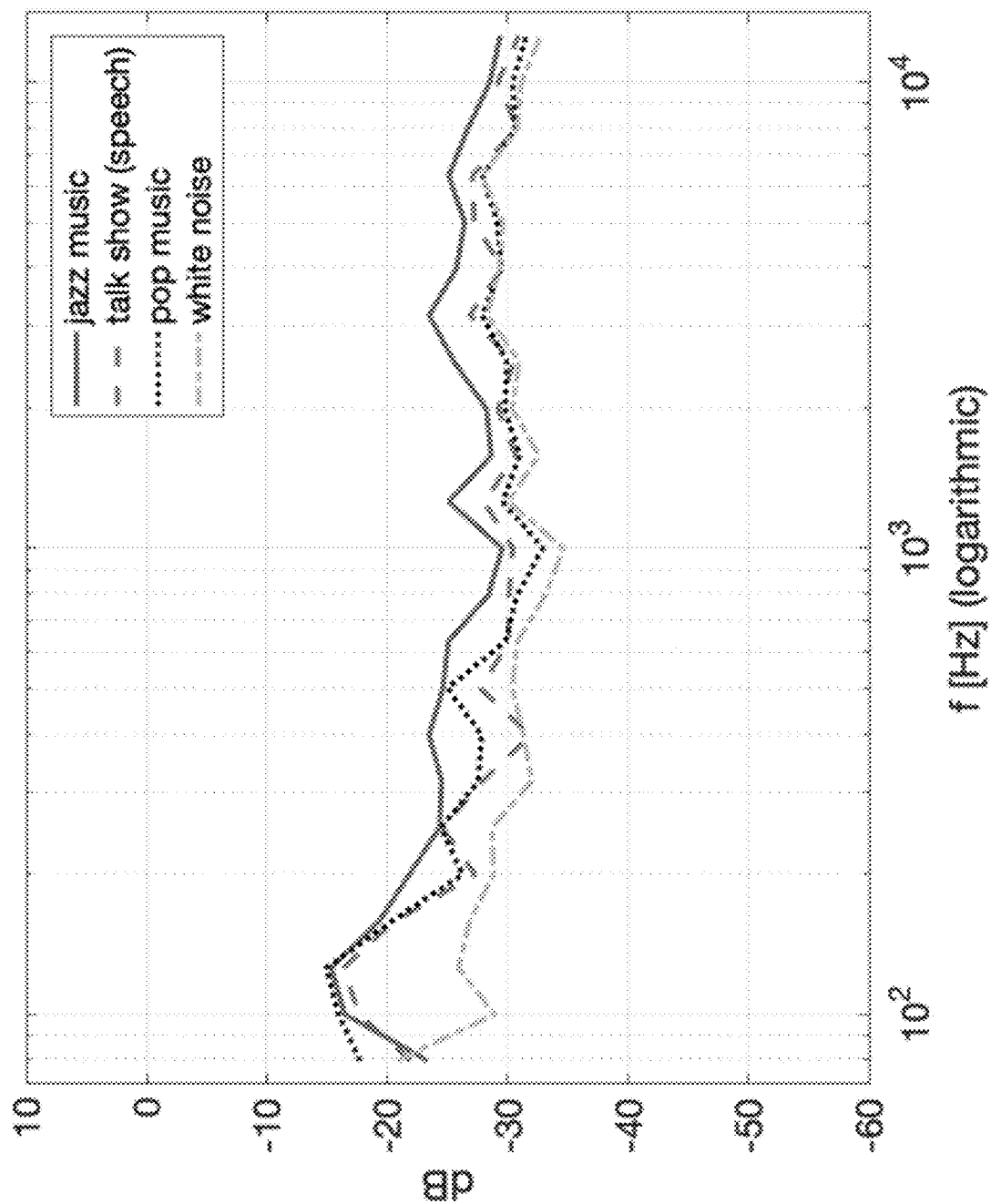
FIG. 10 shows the normalized error averaged in ⅓ octaves for all the input signals, used in the listening test.

FIG. 10 shows the normalized error averaged in ⅓ octaves for all the input signals used in the listening test.

Here, the maximum error for these examples is less than −15 dB, but is typically significantly lower.

The total estimation error for the left channel is presented in Table 2 for all input signals.

TABLE 2

| Input signal | Total error [dB] |
| --- | --- |
| White noise | −29.8 |
| Jazz music | −26.7 |
| Pop music | −28.7 |
| Speech | −27.7 |

It can be seen that the frequency dependent errors and total errors obtained using the method proposed by the present invention are reasonably low.

Listening test Several listening test have been performed for evaluating the perceptual-transparency of the calibration signals when played back using the system loudspeakers with speech and music input signals. The listening tests were conducted in the same room described earlier, but with the left and right loudspeakers positioned at (3.2, 6.1, 0.7) m and (4, 6.1, 0.7)m (keeping the same distance of 0.8 m between the loudspeakers), and the listeners were positioned at (3.6, 3.93, 0.7) m, which is 2.17 m on the axis of the loudspeaker middle point.

The listening tests were designed for evaluating the perceptual-transparency of the proposed method, and for comparing performance with that of the baseline solution of signal playback from a single loudspeaker. For this purpose, three systems are considered:

Reference
  playback of the original stereo audio signals,
Test
  playback of the signals after applying the developed method, i.e. playback for the calibration signals, and
Anchor
  playback from the left loudspeaker only.

An ABX comparison-based test was conducted [29] that employs three audio signals with a 5-sec duration, played back with pauses of 1.5-sec between the signals, as presented in Table 3.

TABLE 3

| | A | B | X |
| --- | --- | --- | --- |
| 1 | Reference | Test | Reference/Test |
| 2 | Test | Reference | Reference/Test |
| 3 | Reference | Anchor | Reference/Anchor |
| 4 | Anchor | Reference | Reference/Anchor |

In Table 3, signal X is either Reference or Test with equal probability for the sequences in lines 1-2, or Reference or Anchor for the sequences in lines 3-4. Lines 1-2 serve to investigate if the Test system is perceptually-transparent compared to the Reference system, and, similarly, lines 3-4 serve to investigate if the Anchor system is perceptually-transparent compared to the Reference system. The signal types employed were the speech and music input signals defined in the analysis (described above) of RTF estimation (using the proposed method) for the experimental system described above. Different segments of the same audio material were used for producing signals A, B, and X, and in each test an ABX sequence has been played only once.

Figure 11:
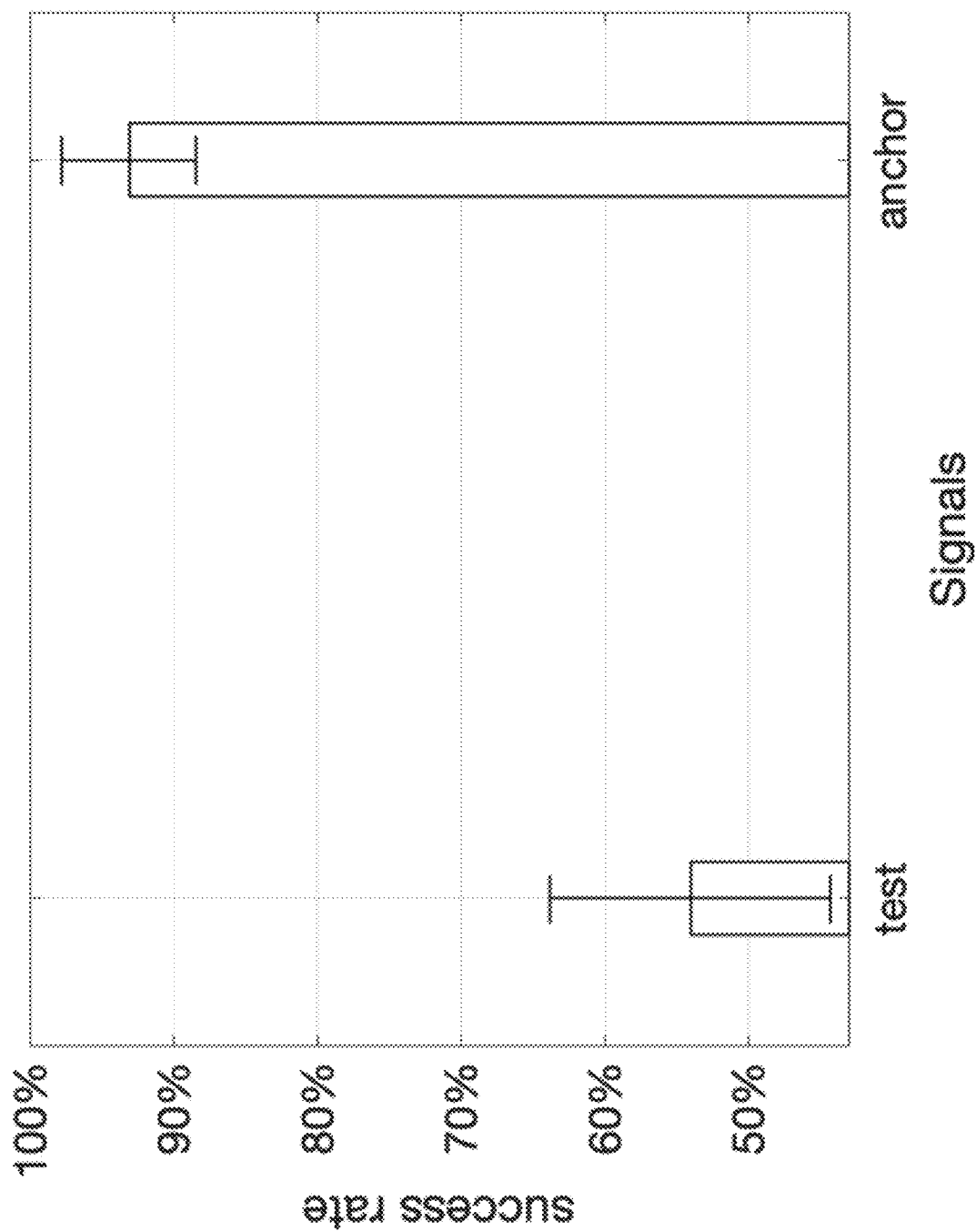
FIG. 11 shows the average success rate of Test and Anchor systems for jazz music, following the listening test.
Figure 12:
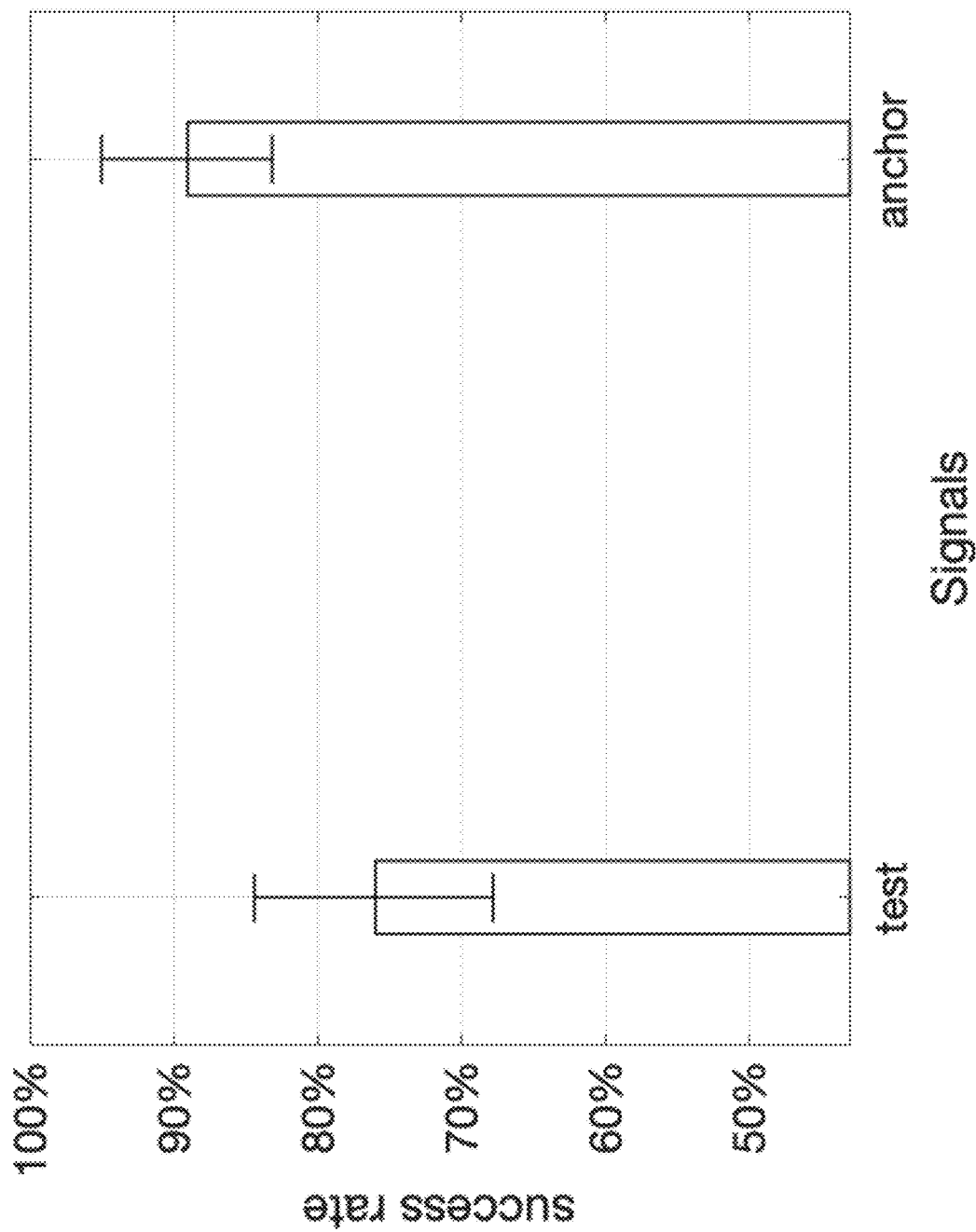
FIG. 12 shows the average success rate of Test and Anchor systems for pop music, following the listening test.
Figure 13:
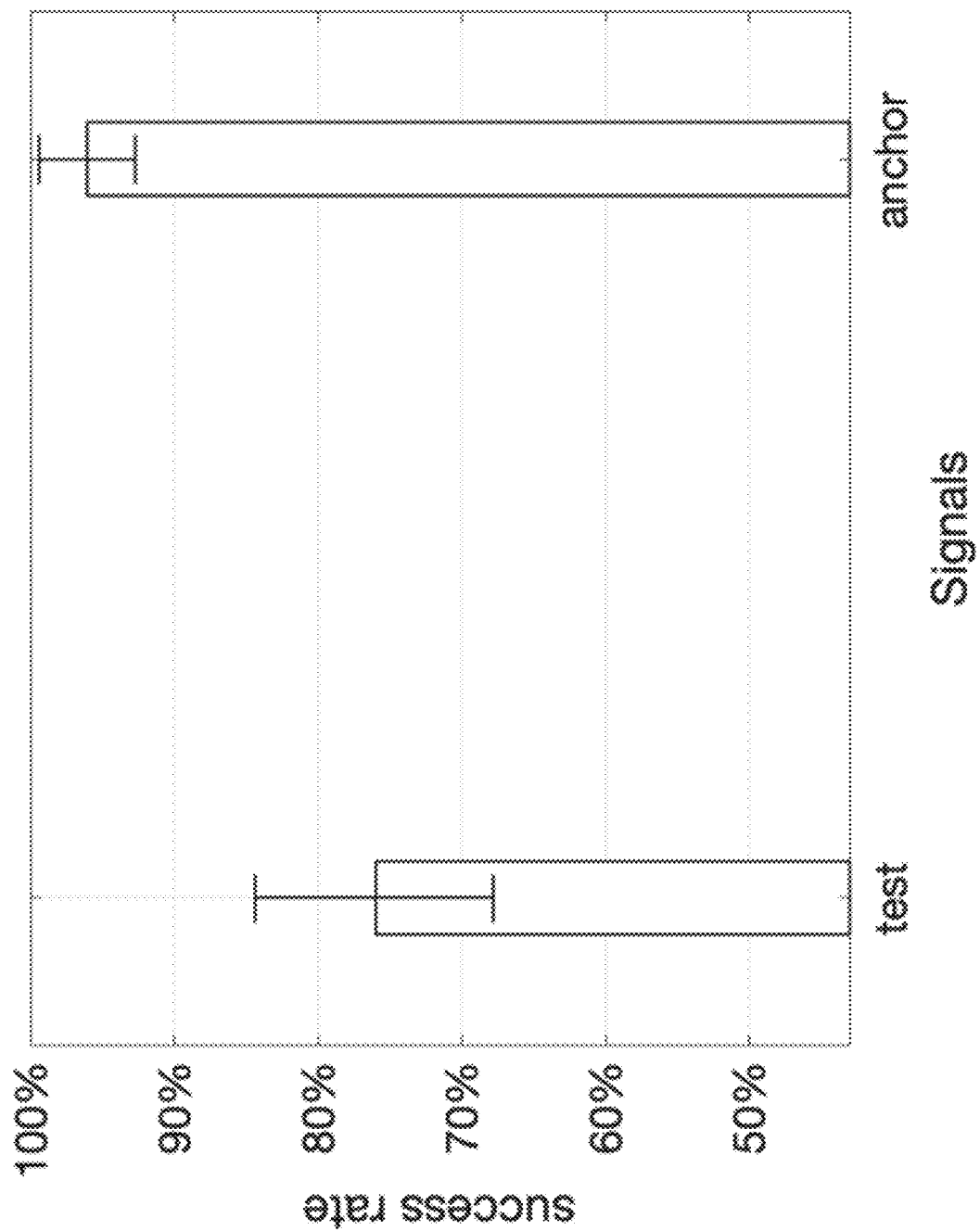
FIG. 13 shows the average success rate of Test and Anchor systems for speech, following the listening test.
Figure 14:
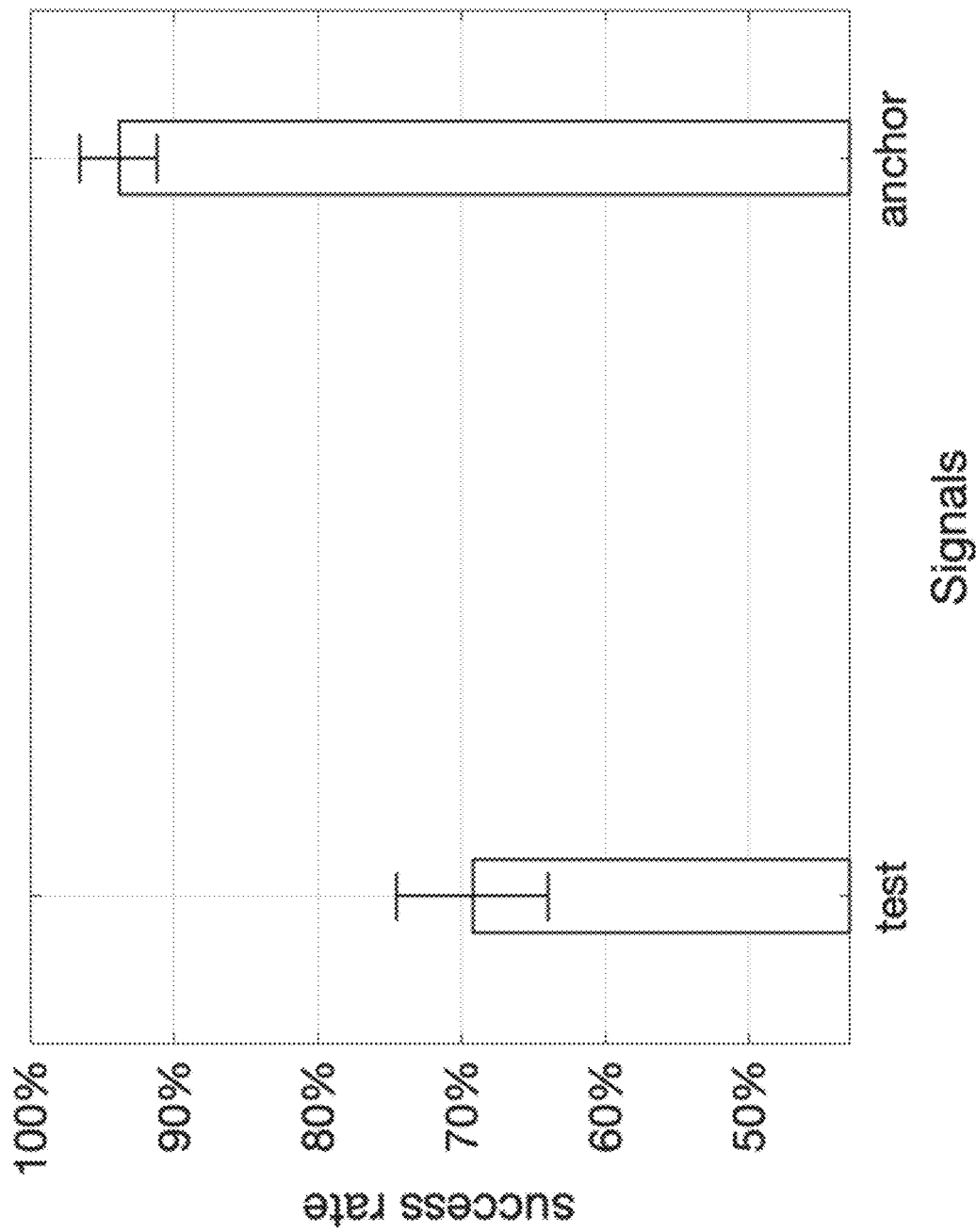
FIG. 14 shows the overall success rate, which is the average for all signal types following the listening test.

FIGS. 11, 12, and 13 show the average success rate of Test and Anchor systems for jazz music, pop music, and speech, respectively, following the listening test. FIG. 14 shows the overall success rate, which is the average for all signal types, following the listening test. A success rate of 50% is interpreted as perceptually-transparent since it corresponds to the average success rate of an equiprobable guess. A success rate of 100% is interpreted as completely non-transparent, and a 75% rate is interpreted as partially-transparent. The results show that the method developed is perceptually-transparent for the jazz music audio recording, and is partially perceptually-transparent for the pop music and speech. On the other hand, the anchor system, or baseline solution is very close to being completely non-perceptually-transparent for all input signals.

The proposed method may be adapted to perform transparent RTF estimation for a multiple-channel system with L loudspeakers for L corresponding audio channels (rather that two). In this case, spectral splitting is performed by using a filter bank and complementary filter banks, to obtain separation in frequency between some or all of these multiple channels (it is possible to use less filter banks than channels. For example, if it is desired to separate only one channel from the rest of the L-1 channels, and in this case, two filter banks will be sufficient). I center frequencies, $f_i$, i=0, ... I−1, with values restricted to the range between zero and half of the sampling frequency, $f_s/2$ are selected, while for each center frequency, a corresponding frequency band, $O_i$ is defined. A corresponding filter, $B_i(f)$ is constructed for each center frequency and frequency band and a filter is constructed for each loudspeaker as a summation of filters for predetermined center frequencies. Calibration signals which are uncorrelated across the multiple channels are then generated using the original audio signals and the constructed filters. These calibration signals are played-back by the plurality of loudspeakers and recorded by the microphone. The recorded played back calibration signals are used to simultaneously estimate the multiple-channel RTF.

The above examples and description have of course been provided only for the purpose of illustrations, and are not intended to limit the invention in any way. As will be appreciated by the skilled person, the invention can be carried out in a great variety of ways, employing more than one technique from those described above, including the internet, a cellular network or any other wireless data network, all without exceeding the scope of the invention.

REFERENCES

[1] D. D. Rife, J. Vanderkooy, Transfer-function measurement with maximum-length sequences, Journal of the Audio Engineering Society 37 (6) (1989) 419-444. [2] C. Dunn, M. J. Hawksford, Distortion immunity of mls-derived impulse response measurements, Journal of the Audio Engineering Society 41 (5) (1993) 314-335.

555 [3] R. C. Heyser, Acoustical measurements by time delay spectrometry, Journal of the Audio Engineering Society 15 (4) (1967) 370-382.

[4] A. Berkhout, M. M. Boone, C. Kesselman, Acoustic impulse response measurement: A new technique, Journal of the Audio Engineering Society 32 (10) (1984) 740-746.

[5] A. Farina, Simultaneous measurement of impulse response and distortion with a swept-sine technique, in: Audio Engineering Society Convention 108, Audio Engineering Society, 2000.

[6] S. Muller, P. Massarani, Transfer-function measurement with sweeps, Journal of the Audio Engineering Society 49 (6) (2001) 443-471.

[7] T. Gustafsson, J. Vance, H. Pota, B. Rao, M. Trivedi, Estimation of acoustical room transfer functions, in: Decision and Control, 2000. Proceedings of the 39th IEEE Conference on, 570 Vol. 5, IEEE, 2000, pp. 5184-5189.

[8] N. Aoshima, Computer-generated pulse signal applied for sound measurement, The Journal of the Acoustical Society of America 69 (5) (1981) 1484-1488.

[9] Y. Suzuki, F. Asano, H.-Y. Kim, T. Sone, An optimum computer-generated pulse signal suitable for the measurement of very long impulse responses, The Journal of the Acoustical Society of America 97 (2) (1995) 1119-1123.

[10] G.-B. Stan, J.-J. Embrechts, D. Archambeau, Comparison of different impulse response measurement techniques, Journal of the Audio Engineering Society 50 (4) (2002) 249-262.

[11] B. S. Lavoie, W. R. Michalson, Auto-calibrating surround system, U.S. Pat. No. 7,158,643 (Jan. 2, 2007).

[12] C. Hak, R. Wenmaekers, J. Hak, L. Van Luxemburg, A. Gade, Sound strength calibration methods, in: International Congress on Acoustics, ICA, 2010.

[13] N. Zacharov, P. Suokuisma, Method for loudness calibration of a multichannel sound systems and a multichannel sound system, U.S. Pat. No. 6,639,989 (Oct. 28, 2003).

[14] J. Johnston, S. Smirnov, Room acoustics correction device, U.S. patent application Ser. No. 11/289,328 (May 31, 2007).

[15] A. Gilloire, M. Vetterli, Adaptive filtering in subbands with critical sampling: analysis, experiments, and application to acoustic echo cancellation, IEEE transactions on signal processing 40 (8) (1992) 1862-1875.

[16] Y. Lin, D. D. Lee, Bayesian regularization and non-negative deconvolution for room impulse response estimation, IEEE Transactions on Signal Processing 54 (3) (2006) 839-847.

[17] P. N. Kulkarni, P. C. Pandey, D. S. Jangamashetti, Binaural dichotic presentation to reduce the effects of spectral masking in moderate bilateral sensorineural hearing loss, International journal of audiology 51 (4) (2012) 334-344.

[18] A. Amano-Kusumoto, J. M. Arono, M. Itoh, S. D. Soli, The effect of dichotic processing on the perception of binaural cues, in: Thirteenth Annual Conference of the International Speech Communication Association, 2012.

[19] P. C. Loizou, A. Mani, M. F. Dorman, Dichotic speech recognition in noise using reduced spectral cues, The Journal of the Acoustical Society of America 114 (1) (2003) 475-483.

[20] H. Vold, J. Crowley, G. T. Rocklin, New ways of estimating frequency response functions, Sound & Vibration 18 (11) (1984) 34-38.

[21] Y. Avargel, I. Cohen, On multiplicative transfer function approximation in the short-time fourier transform domain, IEEE Signal Processing Letters 14 (5) (2007) 337-340.

615 [22] P. Welch, The use of fast fourier transform for the estimation of power spectra: a method based on time averaging over short, modifed periodograms, IEEE Transactions on audio and electroacoustics 5 (2) (1967) 70-73.

[23] H. Herlufsen, Dual channel FFT analysis (part ii), Bruel & Kaejr Technical Review (1984-2).

[24] M. Smith, T. Barnwell, A new filter bank theory for time-frequency representation, IEEE transactions on acoustics, speech, and signal processing 35 (3) (1987) 314-327.

[25] B. ISO, 3382-2, acoustics-measurement of room acoustic parameters-part 2: Reverberation time in ordinary rooms, International Organization for Standardization, Geneve.
[26] Avishai Cohen Trio & Ensemble, "Remembering." At Home, Razdaz Recordz (2005).
[27] Amy Winehouse, "Stronger than me." Frank, Island Records Ltd. (2003).
[28] Trevor Noah Is Lupita Nyong'o's Son (2018), added by The Tonight Show Starring Jimmy Fallon [online]. Available at: https://www.youtube.com/watch?v=ctTK-Ps66rCU [Accessed 31 Oct. 2018].
[29] W. Munson, M. B. Gardner, Standardizing auditory tests, The Journal of the Acoustical Society of America 22 (5) (1950) 675-675.
[30] L. D. Brown, T. T. Cai, A. DasGupta, Interval estimation for a binomial proportion, Statistical science (2001) 101-117.

The invention claimed is:

1. A method for performing perceptually-transparent RTF (Room Transfer Function) estimation for a two-channel system with low estimation errors, comprising:
   a) providing two loudspeakers for the left and right channels positioned in a room and a single microphone, positioned in the vicinity of a listener in said room;
   b) performing spectral splitting using a filter bank and a complementary filter bank, to obtain separation in frequency between said two channels, by:
      b.1) selecting/center frequencies, $f_i$, i=0, ... I−1, having values restricted to the range between zero and half of the sampling frequency, $f_s/2$;
      b.2) for each center frequency, defining a corresponding frequency band, $O_i$;
      b.3) for each center frequency and frequency band, constructing a corresponding filter, $B_i(f)$;
      b.4) constructing a filter for the left loudspeaker as a summation of filters for even center frequencies;
      b.5) constructing a filter for the right loudspeaker as a summation of filters for odd center frequencies;
   c) generating calibration signals being uncorrelated across the two channels using the original audio signals and the constructed filters;
   d) playing back said calibration signals by said loudspeakers, instead of playback of the original audio signals;
   e) recording the playback of said calibration signals by said microphone; and
   f) simultaneously estimating the two-channel RTF using the recorded played back calibration signals.

2. A method according to claim 1, wherein the two filter banks are employed at different operating times.

3. A method according to claim 1, wherein the center frequencies of a complementary set are shifted in frequency, compared to the center frequencies of a set.

4. A method according to claim 3, wherein the shift in frequency is ¼ octave.

5. A method according to claim 1, wherein estimated RTFs are constructed by merging the estimates from each set.

6. A method according to claim 5, wherein merging RTF estimates of multiple sets is performed by fixed mapping.

7. A method according to claim 5, wherein merging RTF estimates of multiple sets is performed by using the pointwise minimum of $|G^*_L(f)G_R(f)|$, wherein $G_L(f)$ and $G_R(f)$ are the filters for the left and right loudspeakers.

8. A method according to claim 1, wherein RTF estimates are performed peroidically every predetermined time, for automatically compensating changes in the acoustic environment.

9. A method for performing transparent RTF (Room Transfer Function) estimation for a multiple-channel system with low estimation errors, comprising:
   a) providing a plurality of loudspeakers for the L channels positioned in a room and a single microphone, positioned in the vicinity of a listener in said room;
   b) performing spectral splitting using a filter bank and L−1 complementary filter banks, to obtain separation in frequency between said multiple channels, by:
      b.1) selecting I center frequencies, $f_i$, i=0, ... I−1, having values restricted to the range between zero and half of the sampling frequency, $f_s/2$;
      b.2) for each center frequency, defining a corresponding frequency band, $O_i$;
      b.3) for each center frequency and frequency band, constructing a corresponding filter, $B_i(f)$;
      b.4) constructing a filter for each loudspeaker as a summation of filters for predetermined center frequencies;
   c) generating calibration signals being uncorrelated across the multiple channels using the original audio signals and the constructed filters;
   d) playing back said calibration signals by said loudspeakers, instead of playback of the original audio signals;
   e) recording the playback of said calibration signals by said microphone; and
   f) simultaneously estimating the multiple-channel RTF using the recorded played back calibration signals.

10. A system for performing transparent RTF (Room Transfer Function) estimation for a multiple-channel system with low estimation errors, comprising:
   a) a plurality of loudspeakers for the L channels positioned in a room and a single microphone, positioned in the vicinity of a listener in said room;
   b) a filter bank and complementary filter banks, for performing spectral splitting;
   c) a processor for separating in frequency between said multiple channels, which is adapted to:
      c.1) select/center frequencies, $f_i$, i=0, ... I−1, having values restricted to the range between zero and half of the sampling frequency, $f_s/2$;
      c.2) for each center frequency, define a corresponding frequency band, $O_i$;
      c.3) for each center frequency and frequency band, construct a corresponding filter, $B_i(f)$;
      c.4) construct a filter for each loudspeaker as a summation of filters for predetermined center frequencies;
      c.5) generate calibration signals being uncorrelated across the multiple channels using the original audio signals and the constructed filters;
   d) a player for playing back said calibration signals by said loudspeakers, instead of playback of the original audio signals;
   e) a recorder for recording the playback of said calibration signals by said microphone; and
   f) at least one processor for simultaneously estimating the multiple-channel RTF using the recorded played back calibration signals.

* * * * *